US011256912B2

(12) United States Patent
Hopen et al.

(10) Patent No.: US 11,256,912 B2
(45) Date of Patent: Feb. 22, 2022

(54) ELECTRONIC FORM IDENTIFICATION USING SPATIAL INFORMATION

(71) Applicant: Switch, Inc., Seattle, WA (US)

(72) Inventors: Chris Hopen, Shoreline, WA (US); Trevor Marcus, Woodinville, WA (US); Christopher Lloyd Harvey, Shoreline, WA (US); Gary Tomlinson, Kenmore, WA (US)

(73) Assignee: Switch, Inc., Seattle, WA (US)

( * ) Notice: Subject to any disclaimer, the term of this patent is extended or adjusted under 35 U.S.C. 154(b) by 262 days.

(21) Appl. No.: 16/532,165

(22) Filed: Aug. 5, 2019

(65) Prior Publication Data

US 2019/0362142 A1    Nov. 28, 2019

Related U.S. Application Data

(63) Continuation of application No. 15/353,619, filed on Nov. 16, 2016, now Pat. No. 10,372,980.

(51) Int. Cl.
*G06K 9/00* (2006.01)
*G06K 9/32* (2006.01)

(52) U.S. Cl.
CPC ..... *G06K 9/00449* (2013.01); *G06K 9/00456* (2013.01); *G06K 9/00463* (2013.01); *G06K 9/325* (2013.01)

(58) Field of Classification Search
CPC .................................................... G06K 9/325
See application file for complete search history.

(56) References Cited

U.S. PATENT DOCUMENTS

| 6,104,833 A * | 8/2000 | Naoi | G06K 9/6807 382/190 |
| 6,490,601 B1 * | 12/2002 | Markus | G06F 21/6245 715/207 |
| 7,343,551 B1 * | 3/2008 | Bourdev | G06F 40/174 715/224 |

(Continued)

FOREIGN PATENT DOCUMENTS

WO    WO03038735    5/2003

OTHER PUBLICATIONS

The PCT Search Report and Written Opinion dated Mar. 30, 2018 for PCT application No. PCT/US2017/061797, 14 pages.

*Primary Examiner* — Sean T Motsinger
(74) *Attorney, Agent, or Firm* — Lee & Hayes, P.C.

(57) ABSTRACT

This disclosure is generally directed to identifying electronic forms using spatial information of elements presented on a website. Identifying a type of an electronic form may include identifying particular input elements associated with the form, determining a bounding region of the input element, expanding the bounding region, and determining any intersections of the expanded bounding region with one or more label elements proximate to the input element. Keywords of the label elements can be analyzed to increase or decrease a confidence level that an input element is associated with a particular input type. A bounding region can be dynamically sized based on a number of intersecting elements. An electronic form can be identified based on the identified input elements. In some instances, the electronic forms may assist a user in accessing or updating remotely stored personal information, including payment information, across one or more third party electronic sites.

20 Claims, 7 Drawing Sheets

(56) References Cited

U.S. PATENT DOCUMENTS

| | | | |
|---|---|---|---|
| 8,214,362 B1 | 7/2012 | Djabarov | |
| 8,381,087 B1* | 2/2013 | Hickman | G06Q 10/10 |
| | | | 715/205 |
| 2001/0043741 A1* | 11/2001 | Mahoney | G06K 9/00463 |
| | | | 382/199 |
| 2002/0062342 A1* | 5/2002 | Sidles | H04L 67/2804 |
| | | | 709/203 |
| 2002/0083068 A1* | 6/2002 | Quass | G06F 40/174 |
| 2004/0205530 A1 | 10/2004 | Borg | |
| 2005/0038785 A1* | 2/2005 | Agrawal | G06F 40/194 |
| 2005/0172018 A1* | 8/2005 | Devine | G06F 21/00 |
| | | | 709/223 |
| 2005/0257148 A1* | 11/2005 | Goodman | G06F 40/174 |
| | | | 715/226 |
| 2006/0064399 A1* | 3/2006 | De Sio | G06F 16/958 |
| 2007/0124665 A1* | 5/2007 | Jensen | G06F 40/174 |
| | | | 715/234 |
| 2008/0189187 A1* | 8/2008 | Hao | G06Q 30/0633 |
| | | | 705/26.41 |
| 2008/0235567 A1* | 9/2008 | Raj | G06F 40/174 |
| | | | 715/226 |
| 2009/0074303 A1* | 3/2009 | Filimonova | G06K 9/00449 |
| | | | 382/224 |
| 2009/0204881 A1* | 8/2009 | Murthy | G06F 40/174 |
| | | | 715/226 |
| 2009/0292981 A1* | 11/2009 | Akiyama | G06F 40/166 |
| | | | 715/226 |
| 2010/0251125 A1* | 9/2010 | Kim | G06F 40/174 |
| | | | 715/735 |
| 2011/0093773 A1* | 4/2011 | Yee | G06F 16/9577 |
| | | | 715/235 |
| 2011/0191676 A1* | 8/2011 | Guttman | G06F 3/00 |
| | | | 715/716 |
| 2011/0271173 A1* | 11/2011 | Ait-Mokhtar | G06F 40/174 |
| | | | 715/226 |
| 2012/0063684 A1* | 3/2012 | Denoue | G06K 9/2072 |
| | | | 382/175 |
| 2012/0136756 A1* | 5/2012 | Jitkoff | G06F 3/04817 |
| | | | 705/27.1 |
| 2013/0073583 A1* | 3/2013 | Licata | G06K 9/00463 |
| | | | 707/769 |
| 2013/0191714 A1* | 7/2013 | Rothschiller | G06F 40/174 |
| | | | 715/226 |
| 2013/0318426 A1* | 11/2013 | Shu | G06K 9/00469 |
| | | | 715/226 |
| 2014/0278585 A1* | 9/2014 | Zerbib | G06Q 40/08 |
| | | | 705/4 |
| 2015/0012805 A1* | 1/2015 | Bleiweiss | G06F 16/93 |
| | | | 715/205 |
| 2015/0234734 A1* | 8/2015 | Agrawal | G06F 11/3688 |
| | | | 714/38.1 |
| 2016/0092914 A1* | 3/2016 | Wiener | G06Q 30/0246 |
| | | | 705/14.45 |
| 2016/0283364 A1* | 9/2016 | Raghavan | G06F 11/3692 |
| 2017/0060821 A1* | 3/2017 | Rucine | G06K 9/00442 |
| 2017/0147554 A1* | 5/2017 | Chen | G06F 40/186 |
| 2017/0199857 A1* | 7/2017 | Greiner | G06N 5/048 |
| 2017/0249318 A1* | 8/2017 | Mescal | G06F 3/0482 |
| 2017/0277374 A1* | 9/2017 | Ozcan | G06F 3/0484 |
| 2018/0103055 A1* | 4/2018 | Keohane | H04L 63/1433 |
| 2018/0129586 A1* | 5/2018 | Gillaspie | G06K 9/00456 |
| 2018/0137351 A1* | 5/2018 | Hopen | G06K 9/325 |
| 2018/0239825 A1* | 8/2018 | Tripathi | G06F 16/951 |
| 2019/0026579 A1* | 1/2019 | Hall | G06K 9/03 |
| 2019/0050641 A1* | 2/2019 | Cervin | G06K 9/00483 |
| 2019/0065456 A1* | 2/2019 | Platow | G06F 40/106 |
| 2019/0073599 A1* | 3/2019 | Crable | G06Q 40/025 |
| 2019/0303432 A1* | 10/2019 | Greiner | G06Q 20/12 |

* cited by examiner

ELECTRONIC FORM IDENTIFICATION USING SPATIAL INFORMATION

CROSS REFERENCE TO RELATED APPLICATION

This is a continuation application which claims priority to commonly assigned, co-pending U.S. patent application Ser. No. 15/353,619, filed Nov. 16, 2016. Application Ser. No. 15/353,619 is fully incorporated herein by reference.

BACKGROUND

Many websites use electronic forms to input data, for example, in connection with the remote storage of electronic information. In some cases, such information can be accessed and/or managed by computing devices without user intervention. For example, some computer applications can include an autofill function that fills a field in a form automatically with information previously input by a user. If a user has provided user data to a third party, that third party can access a website and use autofill to input and/or access the user's data.

Often, an electronic form must be identified and analyzed prior to accessing or managing such information, which presents non-trivial challenges to existing computing devices. In some cases, forms can be manually accessed, identified, and analyzed prior to automation by a computer. In some cases, in an attempt to automate the process, computer applications rely on fields to be labeled or linked to field data to identify a type of field and/or a function associated with the field. However, input elements presented on a website may be mislabeled or may not include identifying information, which may cause incorrect identification of a field or may cause a field to be ignored when analyzed by a computer application.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
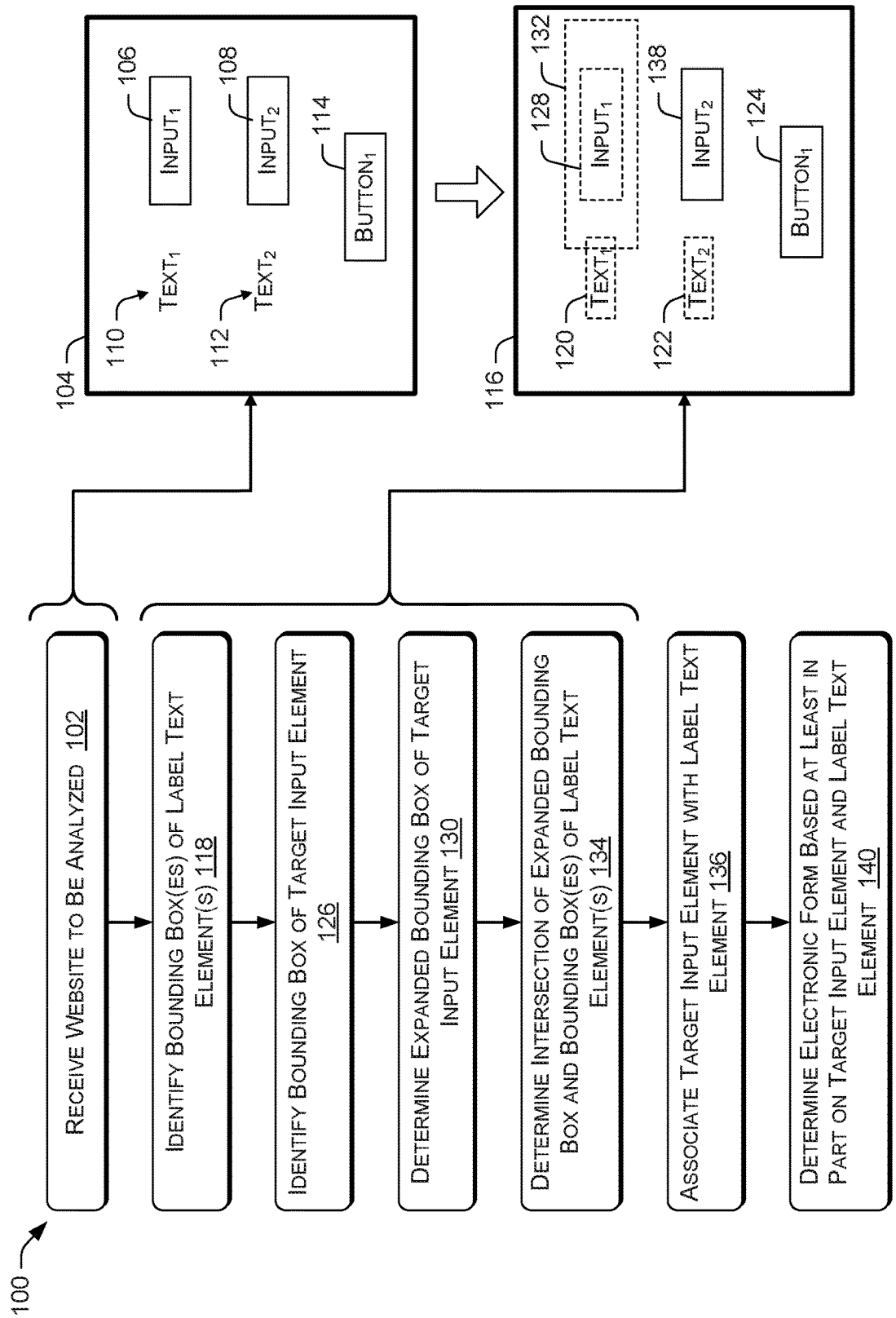
FIG. 1 illustrates a pictorial flow diagram of a process and an example graphical user interface identifying aspects of electronic form identification using spatial information in a computing environment.

This disclosure is generally directed to the access and management of remotely stored data, including identification and analysis of electronic forms using spatial information of elements presented on a website. In some instances, the electronic forms may assist a user in accessing or updating remotely stored personal information, including payment information, across one or more third party electronic sites (e.g., websites, applications, and/or other remote data repositories). Identifying a type of an electronic form may include identifying particular input elements associated with the form. In order to determine whether a target input element (e.g., a username entry field) is associated with an electronic form (e.g., a login form), the identity of the target input element can be determined. When a type of target input element is not expressly or clearly specified, and/or to increase a confidence level that a determined identity of the target input element is correct, a spatial relationship of the target input element can be determined as it relates to one or more label elements. In some instances, input elements may include, but are not limited to, input fields associated with a username, a password, a customer address, payment information, a radio button, a drop-down menu, etc., and in some instances, label elements may include, but are not limited to, one or more of text, graphics, video, audio, etc. presented on a website.

For example, websites commonly include text labels proximate to an input element in order to indicate to a user what information is to be input into the input element. By way of example, and without limitation, a text label "Username" can be presented next to an input element to identify the input element as receiving a username to access a user account. In order for a computing device of the present disclosure to associate the text label with a target input element, a bounding region of each element can be determined. For example, for a rectangular input element, coordinates of the corners of the input element can be determined, which may represent a bounding region of the input element. Similarly, a bounding region of one or more text labels can be determined. For a target input element, the bounding region of the input element can be expanded or inflated to generate an expanded bounding region, and a determination can be made whether the expanded bounding region associated with the target input element intersects with any bounding regions of any identified text labels. If an intersection is determined, text of the text label can be compared to one or more keyword lists that may increase or decrease a confidence level that a target input element is associated with a particular input field. If a particular combination of input elements are determined for a particular website, it can be determined (e.g., based on a rule set) that the website represents a particular electronic form.

In some embodiments, an expanded bounding region of an input element can be determined by increasing a size of the bounding region of the input element by a default amount, such as a default relative or absolute number of pixels. In some instances, a size of the expanded bounding region can be based on a resolution of a browser, a size of the input element, a type of device accessing a website, or a number of input elements determined to intersect with an initial expanded bounding region. For example, an initial expanded bounding region can generated and a number of intersections with bounding regions of label elements can be determined. If the number of intersections is below a threshold value, or if no intersections are detected, the size and/or shape of the expanded bounding region can be increased or altered, and an updated number of intersections can be determined. Similarly, if a number of intersections is above a threshold, the size and/or shape of the expanded bounding region can be decreased or altered, and an updated number of intersections can be determined. Although discussed above in the context of expanding a bounding region of a target input element, in some embodiments, a bounding region of a label element can be expanded in addition to or instead of expanding the bounding region of the target input element.

Upon determining an intersection between an expanded bounding region of a target input element and one or more labels, text associated with the one or more labels can be analyzed to determine a confidence level associating the target input element with a type of input element. For example, text associated with the input label (or variations of the text) can be compared with one or more keyword lists to increase or decrease a confidence level that the target input element is associated with an input element type. Further, text associated with the label elements can be used to determine a confidence level that the identified input elements represent a particular electronic form.

For example, a form rule set may be used to determine that that a particular website is associated with a particular electronic form. The form rule set may indicate a number and a type of input elements for a particular website to be associated with an electronic form. By way of example, for a login page associated with a website, the form rule set may specify a username input element and a password username. When accessing a website, a form rule set may be accessed to determine a confidence level of whether the identified elements of the website are associated with the elements identified in the form rule set, and to determine a confidence level reflecting whether the identified elements comprise a particular electronic form. In some instances, the form rule sets can be based in part on label elements (and the associated text) that is associated with the input elements.

The techniques and/or systems described herein can improve a functioning of a computing device by increasing an accuracy of input element identification. For example, input elements that are unlabeled or mislabeled (e.g., in HTML code for rendering the website) can be accurately determined based on a spatial relationship of elements presented on the website. Further, the techniques and/or systems described herein can improve a functioning of a computing device by improving a processing speed of electronic form identification. For example, the techniques described herein can be implemented in a browser of a user computing device and operated as a user navigates between websites. In some instances, rather than parsing through some or all of a Document Object Model (DOM) of a website, the techniques described herein can reduce an amount of website data to be parsed before identifying an electronic form. Further, in a case where the techniques are implemented in a central server such as a service provider, the improvements described herein can provide substantial power savings when scaled across a large number of websites and forms monitored by the service provider. Further, the techniques and/or systems discussed herein can improve the functioning of a computer and/or a network by improving the security of the data transmitted, operated on, and stored in a network. For example, by properly identifying an electronic form, scenarios can be avoided where user information is improperly input in fields that that expose user information to unintended parties.

The techniques and systems described herein may be implemented in a number of ways. Example implementations are provided below with reference to the following figures.

FIG. 1 illustrates a pictorial flow diagram of a process 100 for electronic form identification using spatial information in a computing environment. FIG. 1 illustrates a high-level pictorial flow diagram, and additional details of the implementation are given throughout this disclosure.

At 102, the operation can include receiving a website to be analyzed. For example, a website to be analyzed is illustrated as a website 104. The website 104 can be received in response to a user navigating to a particular website, such as a login page for a user account, or a payments page for inputting or updating payment information associated with the user. By way of example, and without limitation, the website 104 can include any number of elements, such as input elements 106 and 108, text labels 110 and 112, and a button 114. In some instances, the website 104 can be received as HTML (Hypertext Markup Language), XML (Extensible Markup Language), etc., and in some instances, the elements 106, 108, 110, 112, and 114 can be represented in a Document Object Model (DOM) tree.

Further, a website 116 illustrates a visual representation of analysis of the website 104, in accordance with aspects to the process 100.

In some instances, the operations of the process 100 can be performed on a user device, such as a browser extension or script installed or activated by the user. In some instances, the operations of the process 100 can be performed on a service provider that crawls websites associated with one or more users to identify forms and/or identify any changes to forms over time. Additional details of an environment implementing the process 100 are described in connection with FIG. 2.

At 118, the operation can include identifying bounding boxes of label text elements. For example, this operation 118 can include analyzing the website 104 to identify label elements that may be associated with input elements on the website 104. In some instances, the operation 118 includes threshold operations and/or pruning operations to determine whether the website 104 may contain elements that warrant further investigation. Once label text elements are identified, a bounding box for each element can be identified. This operation can include determining and/or receiving one or more coordinates associated with the label text elements. For example, referring to the website 116, a bounding box 120 is illustrated as a dashed line surrounding the text label "Text$_1$", which can correspond to the text label 110 of the website 104. Similarly, a bounding box 122 is illustrated as a dashed line surrounding the text label "Text$_2$", which can correspond to the text label 112 of the website 104.

In some instances, the operation 118 is implemented on website elements corresponding to a particular type. For example, in one embodiment, a button 124 may not correspond to a label element type, and accordingly, a bounding box would not be determined. In other embodiments, a bounding box can be determined for a plurality of element types in the operation 118.

At 126, the operation can include identifying a bounding box 128 of a target input element. In some instances, the target input element can be correspond to the input element 106 as illustrated in the website 104. In some instances, the bounding box 128 can correspond to relative or absolute coordinates occupied by the target input element (e.g., the input element 106) in the website 104.

At 130, the operation can include determining an expanded bounding box 132 of the target input element (e.g., "Input$_1$" of the website 116). In some instances, the expanded bounding box 132 can be determined by expanding the bounding box 128 in each direction by an absolute amount (e.g., 50 pixels in each direction) or by a relative amount (e.g., 10% in each direction). As explained in more detail below, in some instances, the expanded bounding box 132 can be expanded in any number of directions, and in some instances, the expanded bounding box 132 can correspond to a variety of shapes, including but not limited to a square, rectangle, circle, ellipse, oval, triangle, or any regular or irregular polygon or shape.

At 134, the operation can include determining one or more intersections of the expanded bounding box (e.g., the expanded bounding box 132) and bounding boxes of label text elements (e.g., bounding boxes 120 and 122). As illustrated in the website 116, the expanded bounding box 132 intersects the bounding box 120. In some instances, the operation 134 receives as inputs coordinates corresponding to each bounding box (e.g., the bounding box 120 or 122), coordinates corresponding to the bounding box of the target input element (e.g., 128), and an expansion factor (e.g., 50 pixels) to determine one or more intersections with the expanded bounding box 132. In some instances, the operation 134 is based at least in part on the separating axis theorem, which determines (in general) whether a line can be drawn between two polygons (e.g., indicating no intersection) or whether no line can be drawn between the two polygons (e.g., indicating an intersection). In some instances, the operation 134 can include a separating axis theorem algorithm to determine intersections, as discussed herein.

At 136, the operation can include associating the target input element with the label text element. For instance, the target input element 128 (e.g., 106) can be associated with the text label 120 (e.g., 110), such that the target input element 128 can be determined to have an input type corresponding to the text label. In some instances, the operation 136 can include comparing text associated with the text label 110 with one or more keyword lists to increase or decrease a confidence level that the target input element 128 is associated with the text label 120.

In some instances, the operations 126, 130, 134, and 136 can be performed for the remaining input element 138.

At 140, the operation can include determining an electronic form based at least in part on the target input element and the label text element. Further, the operation 140 can include determining the electronic form based at least in part on additionally determined input elements, such as the input element 138. For example, the input elements 106 and 108, and the button 114, can be determined to correspond to a login site to access a user account, a website to update payment information, a website to change a customer address, etc.

Figure 2:
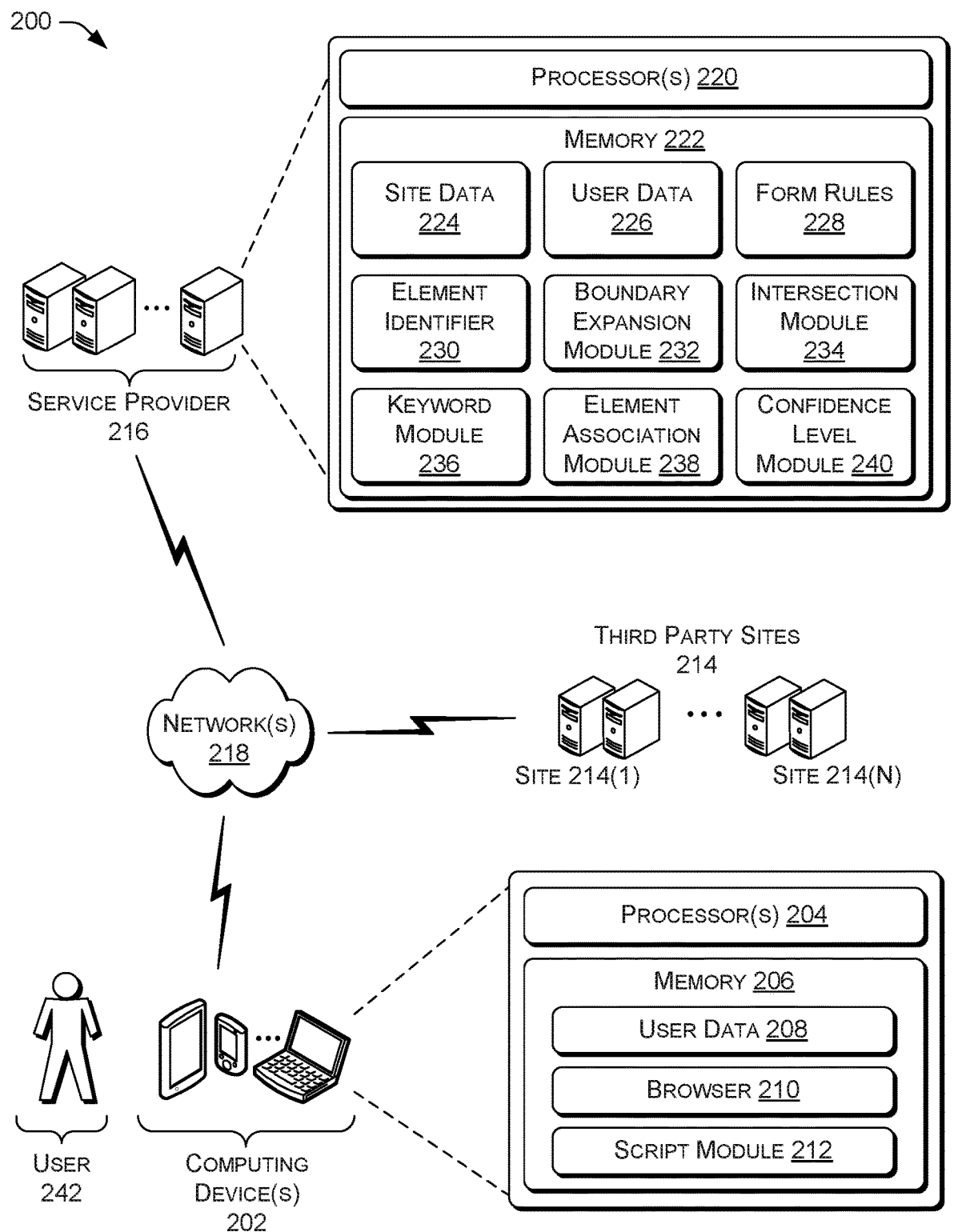
FIG. 2 illustrates an example environment for implementing the electronic form identification using spatial information.

FIG. 2 illustrates an example environment 200 for implementing the electronic form identification using spatial information. The environment 200 includes computing device(s) 202 having processor(s) 204 and a memory 206. In some instances, the memory 206 can include user data 208, a browser 210, and a script module 212. In some instances, the script module 212 can perform the operations described in connection with FIG. 1.

The environment 200 also includes third party sites 214 (including site 214(1) . . . site 214(N)) that can be accessed by the computing devices 202 or a service provider 216 via a network 218. In some instances, the network 218 can represent one or more wired or wireless networks, such as the Internet, a Mobile Telephone Network (MTN), or other various communication technologies. In some instances, the network 218 can include any WAN or LAN communicating via one or more wireless protocols including but not limited to RFID, near-field communications, optical (IR) communication, Bluetooth, Bluetooth low energy, ZigBee, Z-Wave, Thread, LTE, LTE-Advanced, WiFi, WiFi-Direct, LoRa, Homeplug, MoCA, Ethernet, etc.

In some instances, the service provider 216 can perform operations to identify an electronic form using spatial information. To that end, the service provider can include processor(s) 220 and a memory 222 including site data 224, user data 226, form rules 228, an element identifier 230, a boundary expansion module 232, an intersection module 234, a keyword module 236, an element association module 238, and a confidence level module 240.

The environment 200 also includes the one or more users 242 to employ the computing devices 202. The one or more users 242 can interact with the computing devices 202 (and/or the service provider 216 or the third party sites 214) to perform a variety of operations.

As introduced above, the computing device(s) 202 can include, but are not limited to, any one of a variety of computing devices, such as a smart phone, a mobile phone, a personal digital assistant (PDA), an electronic book device, a laptop computer, a desktop computer, a tablet computer, a portable computer, a gaming device, a personal media player device, a server computer, a wearable device, or any other electronic device.

Further, the computing device(s) 202 (also referred to as a computing device 202) can include the processor(s) 204 and the memory 206. The processor(s) 204 can be a single processing unit or a number of units, each of which could include multiple different processing units. The processor(s) 204 can include one or more microprocessors, microcomputers, microcontrollers, digital signal processors, central processing units (CPUs), graphics processing units (GPUs), security processors (e.g., secure cryptoprocessors), and/or other processors. Alternatively, or in addition, some or all of the techniques described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), state machines, Complex Programmable Logic Devices (CPLDs), other logic circuitry, systems on chips (SoCs), and/or any other devices that perform operations based on software and/or hardware coded instructions. Among other capabilities, the processor(s) 204 can be configured to fetch and/or execute computer-readable instructions stored in the memory 206.

The memory 206 can include one or a combination of computer-readable media. As used herein, "computer-readable media" includes computer storage media and communication media.

Computer storage media includes volatile and non-volatile, removable and non-removable media implemented in any method or technology for storage of information, such as computer-readable instructions, data structures, program modules, or other data. Computer storage media includes, but is not limited to, Phase Change Memory (PCM), Static Random-Access Memory (SRAM), Dynamic Random-Access Memory (DRAM), other types of Random-Access Memory (RAM), Read-Only Memory (ROM), Electrically Erasable Programmable ROM (EEPROM), flash memory or other memory technology, Compact Disc ROM (CD-ROM), Digital Versatile Discs (DVD) or other optical storage, magnetic cassettes, magnetic tape, magnetic disk storage or other magnetic storage devices, or any other medium that can be used to store information for access by a computing device.

In contrast, communication media includes computer-readable instructions, data structures, program modules, or other data in a modulated data signal, such as a carrier wave. As defined herein, computer storage media does not include communication media.

The user data 208 can include payment data, login data, or other data associated with the user 242, such as address or contact information including phone numbers, emails, etc. The user data 208 may include information to enable use of a payment instrument, such as credit card numbers, expiration dates, bank account numbers, and/or other payment information. In some embodiments, some or all of the user data 208 may be stored on the service provider 216. However, the user data 208 may be stored or at least accessible by the service provider 216 in some embodiments.

The browser 210 may be a conventional web browser or other application that is configured to enable an exchange of data with the third party sites 214 and/or the service provider 216. In some embodiments, the browser 210 may be a specialized application used to access a specific content provider. However, the browser 210 may typically be implemented as a general purpose application that can read hypertext markup language (HTML) documents and other documents and languages commonly associated with data available by way of the Internet. The browser 210 may include one or more plug-ins and/or toolbars that enable at least some of the functionality discussed herein.

The script module 212 may enable execution of a script provided by the service provider 216. In some instances, the script module 212 may perform operations corresponding to the process 100 described above in connection with FIG. 1. As discussed in detail throughout this disclosure, the script module 212 can perform operations described in connection with the various processes and/or performed by the service provider 216. The script module 212 may operate to cause the browser 210 or another resource or application to perform certain predetermined functions with little or no user interaction. The script module 212 may be installed or enabled by the user or by the service provider 216 to perform the operations of electronic form identification as described herein. Thus, the script module 212 may execute the script on the user device(s) 202, possibly as a plug-in or toolbar associated with the browser 210. In some embodiments, the script module 212 may update the script with at least some of the user data 208, such as to add payment information, cookies, user credentials, etc. to a script that causes an update of information associated with one or more of the third party sites 214. However, the user information may already be included in the script in some instances when the information is available to the service provider 216. The script module 212 may receive the scripts from the service provider 216 and/or may transmit information back to the service provider 216 in response to execution of a script, such as to report an identification of an input element associated with a website, report identification of an electronic form, an error event, report a successful event, and/or report other information such as a change in a site or other site data.

As discussed above, the computing device 202 may execute the scripts received from the service provider 216. By executing the scripts on the computing device 202, the user 242 may more fully control execution of the scripts and control use of the user's personal data, especially when the user data 208 is stored, at least in part, on the computing device 202. Further, execution of the script by the computing device 202 may minimize errors or connectivity problems caused by security features of some sites, which may fingerprint a computing device 202 approved to access the site (e.g. sites 214(1) ... 214(N)), etc. The computing device 202 may send a script, which may be modified by the computing device 202 after receipt from the service provider 216, to a site. For example, the modification may be to input personal information that is stored on the computing device 202 into the script. The site may then send a result to the computing device 202 in response to execution of the script. For example, when the script is used to update personal data, the result may be a confirmation page that the data has been successfully updated. In some embodiments, the computing device 202 may forward or send information pertaining to the result to the service provider 216. The computing device 202 may include an application that presents one or more user interfaces that enable the user 242 to interact with the service provider 216, manage information, cause updates of information (via the scripts), and/or perform other functions discussed herein.

In general, the service provider 216 may include functionality to access various data provided from a site, such as pages and other content, including input forms. For example, the service provider 216 may crawl all pages provided by a site, such as a host uniform resource located (e.g., www.website.com). The service provider 216 may determine input elements and assign a purpose to respective input elements, and may ultimately identify an electronic form associated with the input elements. For example, the service provider 216 may determine that a first email input field is used to subscribe to a newsletter while a second email input field is used to confirm a user identity. The service provider 216 may determine a purpose of an input element based on sematic analysis of information on a page or proximate to the input field, links associated with the page, spatial information in the page (e.g., DOM tree distance describing how many hops to traverse the tree, a pixel distance, etc.) between different input elements, and/or other information. In some embodiments, the service provider 216 may seek to identify certain features of a site and thus not analyze the entire site. For example, the service provider 216 may determine how to access a portion of the site used to set or change a default payment instrument, which may be an intended goal of an operation performed by the service provider, for example. Once this part of the site is identified and analyzed, other remaining portions of the site may not be analyzed. The service provider 216 may populate the site data 224 with data for many sites, and possibly for different versions of a same site.

In some instances, the service provider 216 may include functionality to input information, activate fields, or otherwise perform an action to expose additional input fields. For example, in some instances, a credit card type must be selected before an input field accepting a credit card number is presented on the website. Thus, the service provider 216 can expose all input elements to accurately identify an electronic form.

Turning to the site data 224 stored in the memory 222 of the service provider 216, the site data 224 can include data for each site that is analyzed. To collect the site data 224, service provider 216 may send requests to sites (e.g., the third party sites 214) and receive page data in response to the requests. The service provider 216 can inspect the page data to determine inputs associated with different portions of a site (e.g., pages, tabs, etc.) and functions of those inputs, as described herein. For example, a site may have multiple fields that enable input of a username. Some of these fields may be associated with a login while others may be used to update a user name, retrieve a password, and/or perform another action. Thus, the service provider 216 may capture and analyze information provided by the site and/or other associated information (e.g., external references/links, and/or other associated data) to determine an intent or function of an input element, as described herein. In some instances, the site data 224 can include determinations and associations between target input elements and label elements, as well as a particular electronic form represented by a website.

In some instances, the service provider 216 can include the user data 226, which can correspond to some or all of the user data 208 of the computing device(s) 202.

The form rules 228 can include one or more rule sets that can be used to identify an electronic form based at least in part on a number and type of website elements, such as input elements, as discussed herein. Further, the form rules 228 can include a minimum threshold, for example, of input elements (whether identified or unidentified) for associating input elements with a particular form type. In some instances, the form rules 228 can also include one or more keywords that can be used to increase or decrease a confidence level that input elements associated with a website correspond to a particular electronic form. In some instances, the form rules 228 can provide a rule set for each electronic form to be determined. Examples of electronic forms can be described by an action to be performed by a respective form. By way of example, and without limitation, possible action types (and corresponding electronic forms) include: user registration; navigate to user login; user login; change password; navigate to payment method page; add payment method; remove payment method; check payment method on file; edit account credentials (e.g., username, password, settings, address, etc.).

The element identifier 230 can include functionality to identify elements within a website, such as one or more input elements, one or more label elements, buttons, content, etc. In some instances, the element identifier 230 can identify elements based at least in part on an element type specified in a Document Object Model (DOM). In some instances, the element identifier 230 can parse a DOM associated with a website to reduce a number of elements to be analyzed, thereby improving a processing speed of the operations.

The boundary expansion module 232 can include functionality to expand a bounding region of one or more elements identified by the element identifier 230. For example, the boundary expansion module 232 can determine a boundary of identified elements, including x-coordinates and y-coordinates representing an area occupied by an element on a website. In some instances, the boundary expansion module 232 can identify a particular element to expand a boundary, such as a target input element and/or a label element. In some instances, the boundary expansion module 232 can determine a shape of an expanded bounding region, such as a square, rectangle, circle, ellipse, oval, triangle, or any regular or irregular polygon or shape. In some instances, the boundary expansion module 232 expand a bounding region based on a default absolute amount or relative expansion factor, and in some instances, the module 232 can dynamically adjust an expanded bounding region based on a number of intersections. In some instances, the boundary detection module 232 can dynamically change a bounding region and determine intersections at varying levels of expansion to rank and/or determine relative and/or absolute positions of elements on a website. Additional aspects of the boundary expansion module 232 are described in connection with the various figures of this disclosure.

The intersection module 234 can include functionality to determine an intersection between an expanded bounding region of a target element (e.g., a target input element, a target label element, etc.) and one or more bounding regions of other elements. For example, the intersection module 234 can determine an intersection between bounding regions of two or more elements based at least in part on a separating axis theorem, or variations thereof.

The keyword module 236 can include one or more keyword lists that can be used to increase or decrease a confidence level of an association between a target input element and an actual type of the input element. In some instance, the keyword module 236 can receive text associated with a label element (e.g., intersecting with an expanded bounding region) and compare the text (or any variations thereof) with the one or more keywords. For example, the keyword module 236 can compare contextual variations, truncated variations, plural/singular variations, language variations (e.g., different languages), alternate spellings, etc. to determine a type of input element associated with the target input element. Further, the keyword module 236 can compare various keywords associated with elements with one or more keywords lists associated with the form rules 228 to identify (or disqualify) an electronic form associated with the input elements.

The element association module 238 can include functionality to associate a target input element with one or more label elements. In some instances, if there are multiple label elements determined to intersect with an expanded bounding box (or region), the element association module 238 can identify the label element to be associated with the target input element. In some instances, the element association module 238 determine an association based at least in part on a confidence level, spatial proximity, a number of alternative elements, etc. In some instances, the element association module 238 can provided an indication to a user (e.g., as an icon, a changed color, a checkmark, a graphic, etc.) indicating that the operations have associated the target input element with a particular type of input element.

The confidence level module 240 can include functionality to operate in conjunction with the various components and modules described herein to determine a confidence level that a target input element is actually associated with a type of input element, and/or to determine a confidence level that one or more input elements comprise an electronic form.

As used herein, the term "module" is intended to represent example divisions of software and/or firmware for purposes of discussion, and is not intended to represent any type of requirement or required method, manner or organization. Accordingly, while various "modules" are discussed, their functionality and/or similar functionality could be arranged differently (e.g., combined into a fewer number of modules, broken into a larger number of modules, etc.). Further, while certain functions are described herein as being implemented as software modules configured for execution by a processor, in other embodiments, any or all of the functions can be implemented (e.g., performed) in whole or in part by hardware logic components, such as FPGAs, ASICs, ASSPs, state machines, CPLDs, other logic circuitry, SoCs, and so on.

The service provider 216 can include one or more computing devices, such as one or more desktop computers, laptop computers, servers, and the like. The one or more computing devices can be configured in a cluster, data center, cloud computing environment, or a combination thereof. In one example, the one or more computing devices provide cloud computing resources, including computational resources, storage resources, and the like, that operate remotely from the computing device(s) 202.

In some instances, the processor(s) 220 and the memory 222 of the service provider 216 can include similar hardware and/or software as that described herein with respect to the processor(s) 204 and the memory 206 of the computing device 202, and vice versa. Further, features described in connection with the service provider 216 can be performed by the computing device(s) 202, and features described in connection with the computing device(s) 202 can be performed by the service provider 216. In some embodiments, features can be distributed between the computing device 202 and the service provider 216, with requests and responses provided between the devices to perform the operations described herein.

Additional functionality of the operations and components described above with reference to FIGS. 1 and 2 is discussed with reference to various flow diagrams and examples shown in FIGS. 3-7 and described below.

FIGS. 3A-3E illustrate examples of using spatial information to identify elements of an electronic form.

Figure 3A:
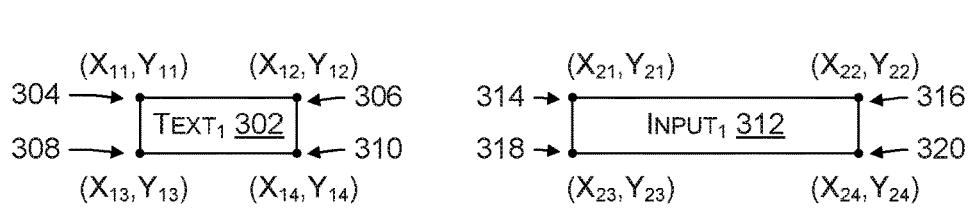
FIGS. 3A-3E illustrate examples of using spatial information to identify elements of an electronic form.

For example, FIG. 3A illustrates an example 300 of determining coordinates of elements represented on a website. A label element 302 can be described by coordinates 304, 306, 308, and 310, and in some instances, the coordinates 304, 306, 308, and 310 can be used to determine a bounding box associated with the label element. In some instances, the label element 302 can be defined by a single point (e.g., a corner point or a center point) and a width and/or height of the label element associated with the single point. In some instances, any number of points can be used to determine a bounding box (or a bounding region) associated with the label element 302.

Similarly, FIG. 3A illustrates an input element 312, which can be described by coordinates 314, 316, 318, and 320. In some instances, the coordinates 314, 316, 318, and 320 (and/or coordinates 304, 306, 308, and 310 associated with the label element 302) can describe a relative or absolute position of the elements presented on a website or a relative or absolute position of the elements presented on a website rendered on a particular device. In some instances, the coordinates 314, 316, 318, and 320 can describe a bounding box (or a bounding region) associated with the input element 312.

Figure 3B:
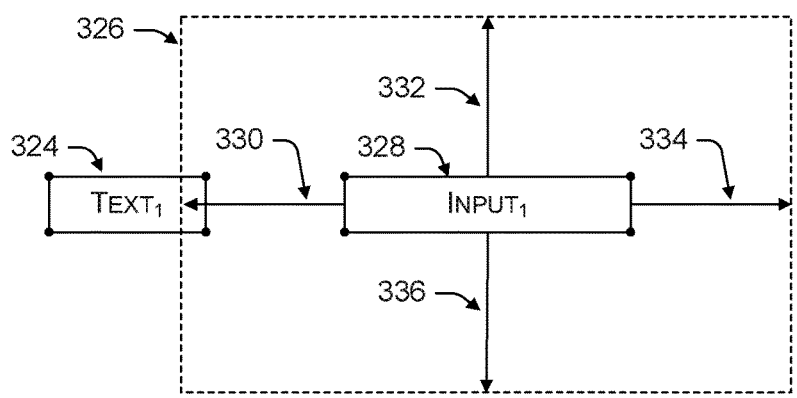

FIG. 3B is an example 322 illustrating a label element (identified by the text "Text$_1$") and an input element (identified by the text "Inputs") and associated bounding boxes. For example, a bounding box 324 represents a bounding box of the label element, and an expanded bounding box 326 represents an expanded bounding box of the input element. As illustrated, the expanded bounding box 326 was determined by expanding a bounding box 328 associated with the input element by an equal amount in each direction. For example, the bounding box 328 was expanded by a same amount 330, 332, 334, and 336 (e.g., 50 pixels) to form the expanded bounding box 326. It may be understood in the context of this disclosure that any number of pixels (or unit of size, e.g., inches, millimeters, etc.) can be used to generate the expanded bounding box 326. As illustrated, the expanded bounding box 326 intersects with the bounding box 324 of the label element.

Figure 3C:
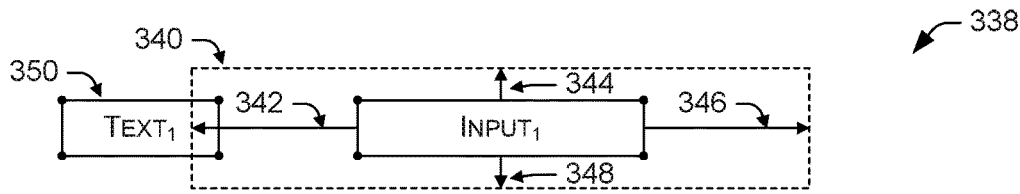

FIG. 3C includes an example 338 illustrating an expanded bounding box 340 generated using proportional expansion factors 342, 344, 346, and 348. In some instances, the proportional expansion factors 342, 344, 346, and 348 can be set as a same value (e.g., 10%, 30%, 50%, etc.) in each direction, which in some instances, a horizontal expansion factor can be different than a vertical expansion factor. As illustrated, example 338 illustrates the expanded bounding box 340 intersecting with a bounding box 350 associated with the label element "Text$_1$".

Figure 3D:
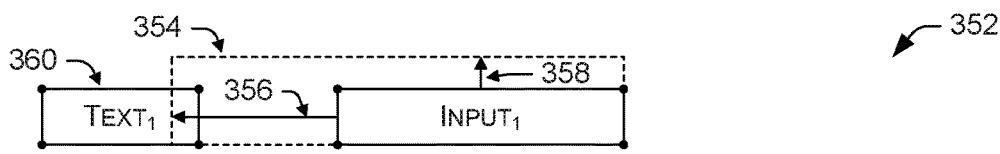

FIG. 3D includes an example 352 illustrating an expanded bounding box 354 expanded in two directions 356 and 358. As illustrated, the directions 356 and 358 are expanded to the left and upwards relative to the bounding box of the input element "Input$_1$". In some instances, the expanded bounding box 354 can be expanded in any number of directions, and is not limited the number of directions and the directions illustrated in the example 352. As illustrated, example 352 illustrates the expanded bounding box 354 intersecting with a bounding box 360 associated with the label element "Text$_1$".

Figure 3E:
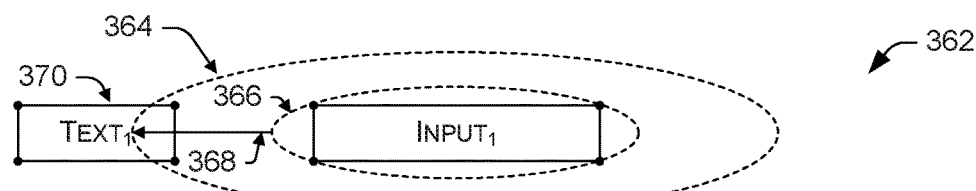

FIG. 3E includes an example 362 illustrating an expanded bounding region 364 represented as an ellipse. For example, a bounding region 366 can be determined as an ellipse with one or more points intersecting with the coordinates of the input element "Input$_1$". In some instances, the bounding region 366 can be expanded proportionally (illustrated by an arrow 368), which expands the bounding region 368 proportionally along a major axis and minor axis of the ellipse. In some instances, a major axis and minor axis can be expanded by absolute or relative amounts. As illustrated, example 362 shows the expanded bounding region 364 intersecting with a bounding box 370 associated with the label element "Text$_1$".

Although FIGS. 3B-3E illustrate an expanded bounding region applied to a target input element, it can be understood in the context of the disclosure that a bounding region can be expanded for a label element, in addition to or instead of expanding a bounding region of the target input element. Further, a bounding region or an expanded bounding region can be shifted in any direction for intersection detection, and is not limited to maintaining a fixed position on a website.

FIGS. 1, 4, 5, and 7 show flow diagrams that illustrative various example processes. The processes are illustrated as a collection of blocks in a logical flow graph, which represent a sequence of operations that can be implemented in hardware, software, or a combination thereof. In some instances, the collection of blocks is organized under respective entities that may perform the various operations described in the blocks. In the context of software, the blocks represent computer-executable instructions stored on one or more computer storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 4:
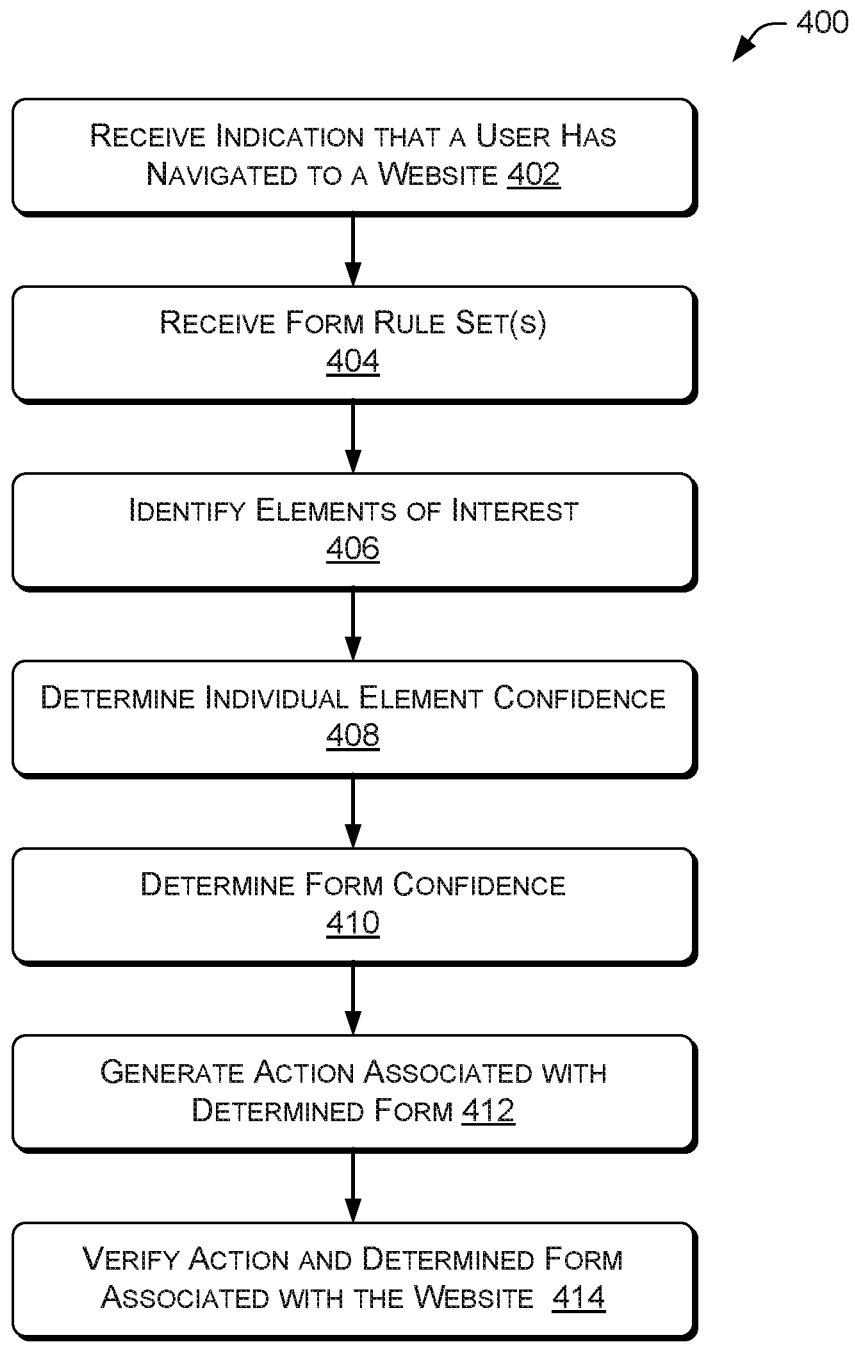
FIG. 4 is a flow diagram of an illustrative process to identify an electronic form, generate an action, and verify the electronic form.

FIG. 4 is a flow diagram of an illustrative process 400 to identify an electronic form, generate an action, and verify the electronic form. The process 400 is described with reference to the environment 200 and may be performed by the computing device 202, the service provider 216, or a combination thereof. Of course, the process 400 may be performed in other similar and/or different environments.

At 402, the operation can include receiving an indication that a user has navigated to a website. In some instances, when the process 400 is performed by the computing device 202 (e.g., as a script or extension running in a browser), the operation 402 can include monitoring a website as a user navigates within the browser 210. In some instances, the operation 402 can include determining that a website is identified or selected by the user as containing a user account or as associated with the user to initiate electronic form identification. In some instances, when the process 400 is performed by the service provider 216, the operation 402 can include receiving an indication from the computing device 202 that a user has navigated to a particular website and/or has indicated that the user is associated with the website.

At 404, the operation can include receiving one or more form rule sets. In some instances, the form rule sets can be maintained by the service provider 216 or the computing device 202 and can indicate rules or criteria indicating a number and type of input elements, proximity of the input elements, keywords associated with the input elements, website addresses, etc., that can be used to identify an electronic form. In some instances the form rule sets may include a confidence level threshold associated with the rule set, such that a confidence level may exceed the threshold in order to determine that a website is associated with a particular electronic form.

At 406, the operation can include identifying elements of interest. In some instances, elements of interest can include input elements, label elements, content (e.g., audio, video, images, etc.), buttons, radio buttons, drop-down menus, etc. In some instances, the operation 406 can include populating a portion of a website to activate or expose additional elements associated with the website. In some instances, the operation can include converting one or more elements into another form, such as performing optical character recognition on an image to determine that an image includes a text label, or performing audio recognition on audio or video to determine text associated with the element. In some instances, the operation 406 can include determining elements based at least in part on one or more attributes included in HTML, XML, XHMTL, and/or a DOM tree associated with the website. In some instances, the operation 406 can reduce a number of elements to be processed in order to improve a processing speed of the operations.

At 408, the operation can include determining an individual element confidence. In some instances, this operation can include associating a target input element with one or more label elements, as discussed herein. For example, this operation 408 includes determining that an individual element (e.g., a target element) is associated with an actual type of input element, such that the function of the input element is known.

At 410, the operation can include determining a form confidence. In some instances, this can include determining, based at least in part on the form rules and/or the individual element confidences determined in the operations 408, that some or all of the individual elements of a website comprise an electronic form.

At 412, the operation can include generating an action associated with the determined form. For example, this operation can include generating one or more scripts to complete a task or to input data specified by a particular form. In some instances, this operation 412 can include accessing user data that is to be input to a determined form. As mentioned above, and without limitation, various actions can include: user registration; navigate to user login; user login; change password; navigate to payment method page; add payment method; remove payment method; check payment method on file; edit account credentials (e.g., username, password, settings, address, etc.)

At 414, the operation can include verifying the action and the determined form associated with the website. In some instances, this operation can include testing an operation of a script generated to perform the action associated with the form, and verifying and/or confirming that the action is properly performed. In some instances, for example, when performed by the service provide 216, this operation can include running the script in different environments, including varying one or more of: a browser version or type; and operating system version or type; device type (e.g., desktop, mobile device, etc.); language (e.g., English, Spanish, French, etc.). Thus, the operation 414 can provide a robust script that while minimizing possible errors.

Figure 5:
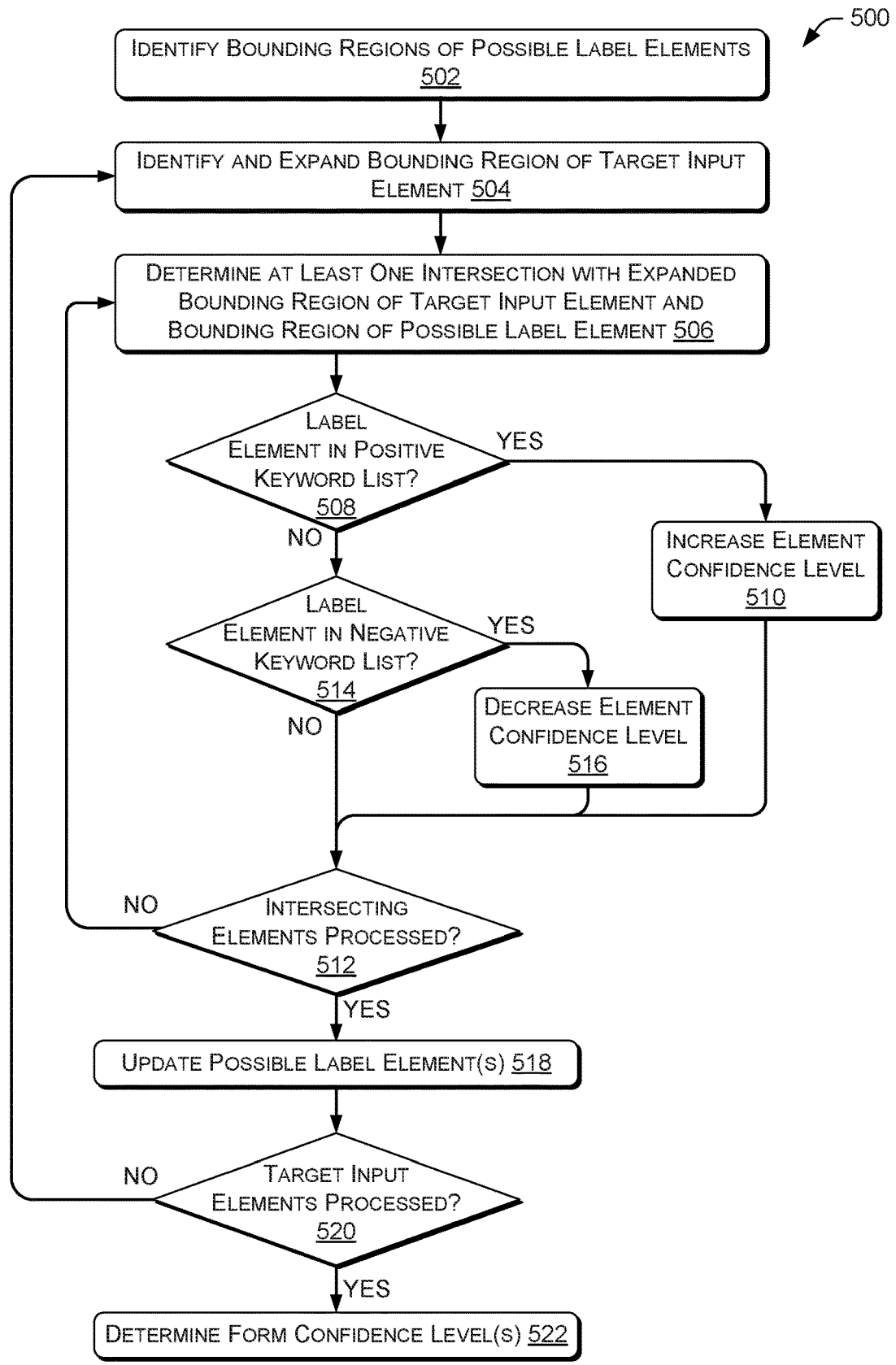
FIG. 5 is a flow diagram of an illustrative process to associate target input elements with possible input labels to determine a form confidence level.

FIG. 5 is a flow diagram of an illustrative process 500 to associate target input elements with possible input labels to determine a form confidence level. The process 500 is described with reference to the environment 200 and may be performed by the computing device 202, the service provider 216, or a combination thereof. Of course, the process 500 may be performed in other similar and/or different environments.

At 502, the operation may include identifying bounding regions of possible label elements. For example, the operation can include determining a bounding region based at least in part on one or more coordinates associated with the label elements to determine an area that each label element occupies. In some instances, the operation 502 includes parsing elements of a website to remove at least a portion of the elements for further analysis. In some instances, removing at least a portion of the elements for further analysis can be based at least in part on an element type associated with each element, a content type, a location of an element on a page, a link associated with an element, etc.

At 504, the operation can include identifying and expanding a bounding region of a target input element. For example, an expanded bounding region can be generated based on a static expansion or dynamically as described herein. In some instances, the operation 504 can select a target input element based on an order that input elements are presented in a Document Object Model (DOM) tree. In some instances, a target input element can be selected based at least in part on one or more attributes associated with the input element. For example, in some instances, the operation 504 selects as a first target input element an input element of type "password," that is, selects a first target input element associated with inputting a password. In some instances, an attribute may specify that input to the particular input element may be hidden, which may increase a confidence level that the input element is associated with a password. As discussed herein, an expanded bounding region can be a square, rectangle, circle, ellipse, oval, triangle, or any regular or irregular polygon or shape.

At 506, the operation can include determining at least one intersection with the expanded bounding region of the target input element and a bounding region of a possible label element. As discussed herein, this operation can include applying the separating axis theorem to the coordinates of the expanded bounding region and the bounding region to determine an intersection of the two shapes. In some instances, this operation can be performed for some or all possible pairs of the expanded bounding region of the target input element and a bounding region of the possible label elements.

At 508, the operation can include determining whether text associated with an intersecting label element is associated with one or more keywords in a positive keyword list. For example, if text associated with a label element is "E-mail", the operation may include determining if the exact text is in the keyword list. In some instances, variations of text may be searched for example, to find matches between "E-mail" and "e-mail", "email," "Email", "electronic mail" etc. In some instances, an exact string may be matched, and in some instances, text variations described herein may trigger a match, such as a case-insensitive match.

At 510, if the label element is found in the positive keyword list ("yes" in operation 508), a confidence level is increased associating a label element to a target input element, and/or associating the target input element to a known input element type.

At 512, the operation includes determining if the intersecting elements have been processed (e.g., those determined in the operation 506). If not all elements have been processed, the operations can return to the operation 506 such that aspects of the process 500 are performed for each intersection between a target input element and the possible label elements.

If a label element is not found in the positive keyword list ("no" in operation 508), the operations can proceed to 514 where the operations can include determining whether text associated with an intersecting label element is associated with one or more keywords in a negative keyword list. Similar to the operations described in connection with the operation 508, the operation 514 can include matching exact text of the label element or a variation of the text with one or more keywords of a negative keyword list. If the text associated with the label element is not found in the negative keyword list ("no" in operation 514), the operations continue to the operation 512 to determine if additional intersecting elements can be processed.

At 516, if the label element is found in the negative keyword list ("yes" in operation 514), a confidence level in decreased associating a label element to a target input element, and/or associating the target input element to a known input element type.

If, in the operation 512, the intersecting elements have been processed ("yes" in operation 512), the processing continues to 518 where the operations include updating a list of possible label elements. For example, if a possible label element has been positively associated with a target input element, the operation 518 can include removing the associated label element from the group of possible label elements, such that subsequent processing is improved by comparing target input elements with a smaller list of possible label elements. In some instances, the operation 518 can include determining that a confidence level associated with a target input element is above a threshold before updating the group of possible label elements.

At 520, the operation can include determining whether target input elements have been processed. For example, some aspects of the process 500 can be performed for each input element present in a website, with each input element selected as a target input element to determine intersections of the target input element with possible label elements. If "no" in the operation 520, the operation can continue to the operation 504 to identify and expand a bounding region of a target input element, such as a new or next target input element to be processed. If "yes" in the operation, the processing can proceed to the operation 522.

At 522, the operation can include determining one or more form confidence levels. For example, the process 500 at the operation 522 may result in one or more input elements associated with a particular input element type, and a confidence level associated with each input element. Based on the number, type, proximity, and other factors associated with the input elements, a form confidence level can be determined. That is, the operation 522 can determine a confidence level indicating that the input elements and/or label elements processed in the process 500 are associated with a particular electronic form.

FIGS. 6A-6D illustrate examples of identifying a username input field and a password input field using spatial information.

Figure 6A:
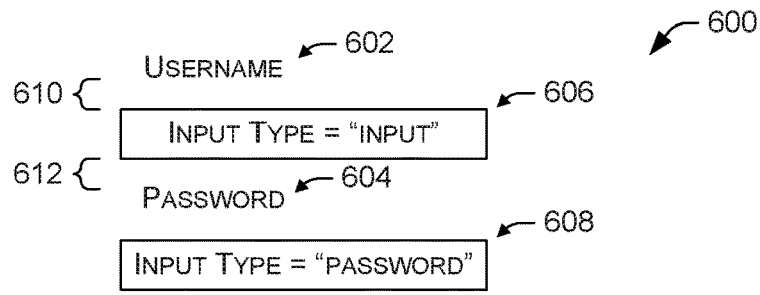
FIGS. 6A-6D illustrate examples of identifying a username input field and a password input field using spatial information.

FIG. 6A includes an example 600 illustrating input elements and label elements of an account login website. For example, FIG. 6A includes label elements 602 and 604, and input elements 606 and 608. In this example, the input element 606 is located equidistance between label elements 602 and 604, such that some implementations of an expanded bounding region associated with the input element 606 would intersect with both label elements 602 and 604. That is, distances 610 and 612 may be sufficiently close (e.g., a same distance) such that distance from the input element 606 alone is not sufficient to determine a type of the input element 606. Further, the input element 606 can include one or more attributes, such as an attribute "Input Type='input'", as illustrated in FIG. 6A. Input element 608 can include one or more attributes, such as an attribute "Input Type='password'", as illustrated in FIG. 6A. In some instances, the one or more attributes associated with the input elements 606 and 608 can be identified in the DOM tree associated with the website presenting the elements 602, 604, 606, and 608.

Figure 6B:
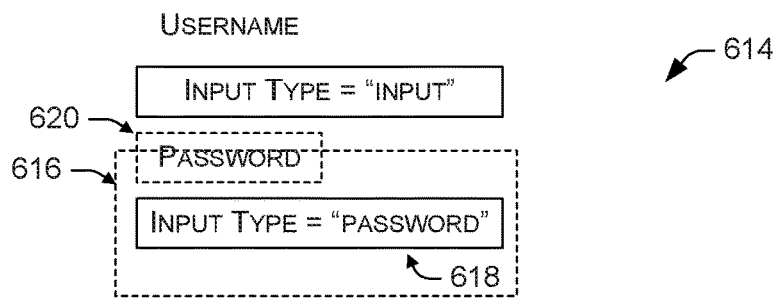

FIG. 6B includes an example 614 illustrating an expanded bounding box 616 represented around an input element 618 (which may correspond to the input element 608 in FIG. 6A). As illustrated, the expanded bounding box is shown to be intersecting with a bounding box 620 around the "Password" label element. In some instances, the input element 618 can be selected as a target input element prior to selecting the input element 606, for example, based at least in part on one or more attributes of the input element.

Figure 6C:
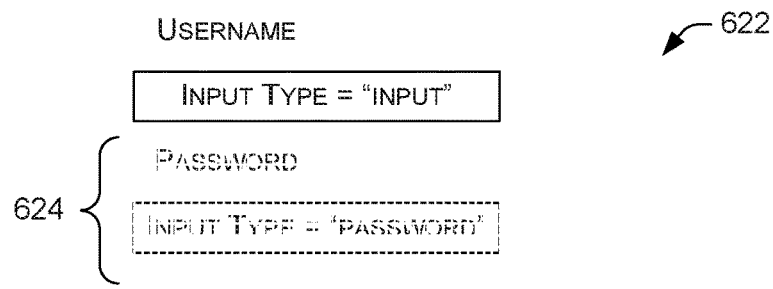

FIG. 6C shows an example 622 illustrating a state 624 representing an association between the input element 608 and the label element 604, for example. In some instances, and as explained above in connection with FIG. 5, a confidence level of the target input element may be above a threshold value such that the label element can be removed as a possible label element for further associations (which has been represented as the state 624).

Figure 6D:
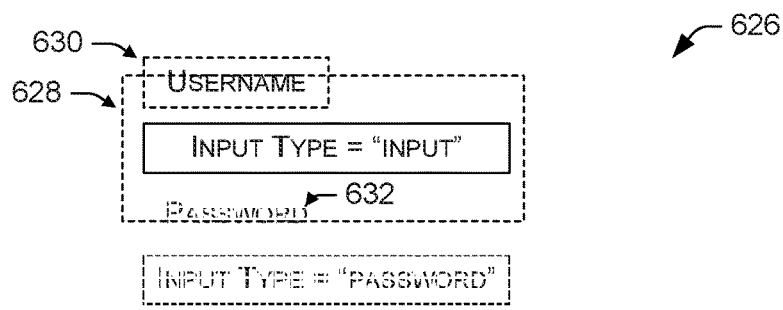

With the label element 604 removed as a possible label element, FIG. 6D shows an example 626 where an expanded bounding box around the remaining input element (selected as a target input element in FIG. 6D) intersects with a bounding box 630 of the label element 602. As discussed above, as label element 632 has been associated with an input element and removed as a possible label element, the expanded bounding box 628 is not determined to intersect with the label element 632. In some instances, the expanded bounding box 628 can be determined to intersect with a bounding box of the input element 632, but a confidence level associating the input element 606 with the label element 604 can be lowered or adjusted based at least in part on the confidence level associating the input label 608 with the label element 604. The examples 600, 614, 622, and 626 are illustrative and are not intended to limit the scope of the input element identification and/or form identification as described herein.

Figure 7:
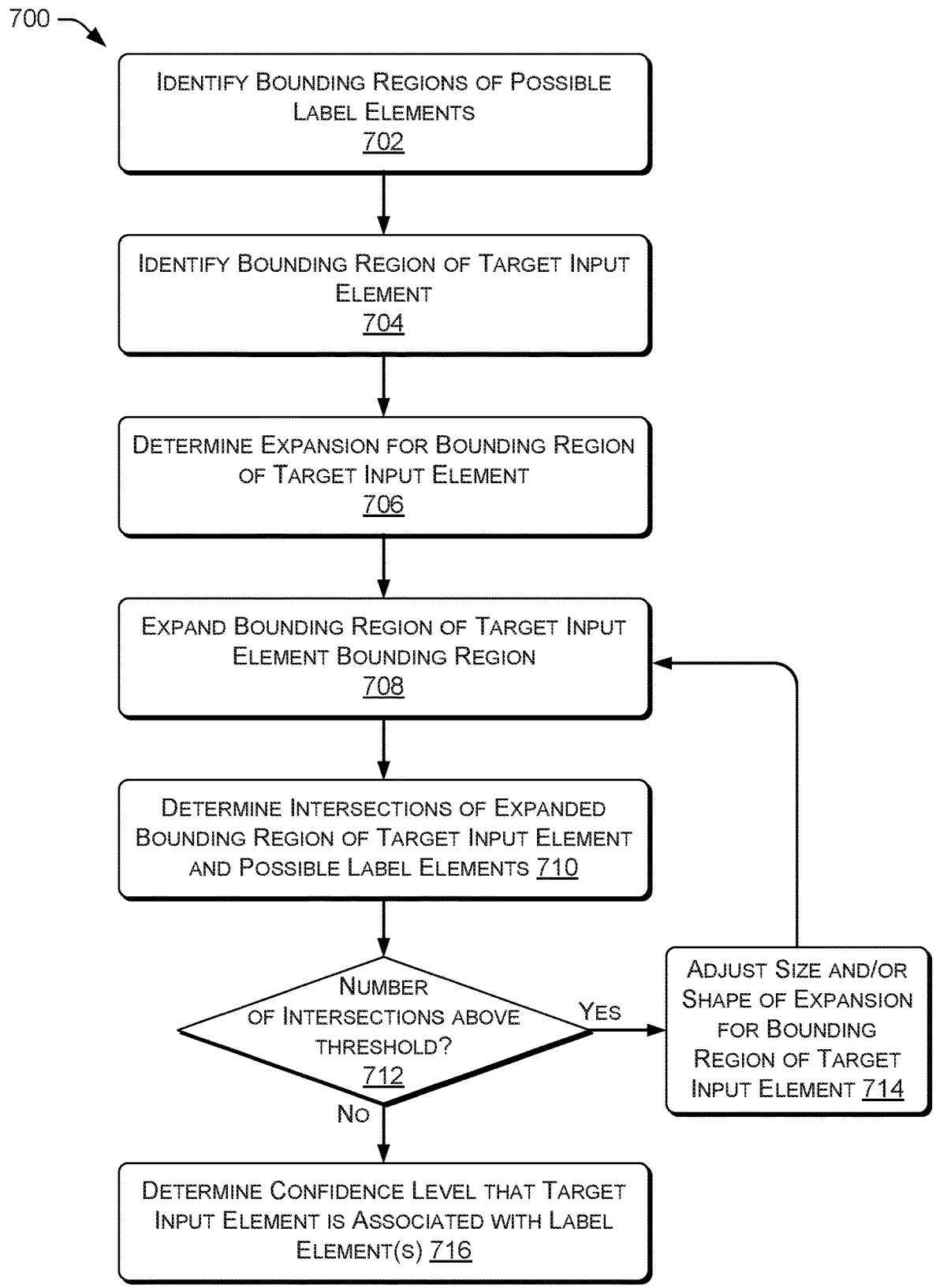
FIG. 7 is a flow diagram of an illustrative process to dynamically determine a bounding region of an input element.

FIG. 7 is a flow diagram of an illustrative process 700 to dynamically determine a bounding region of an input element. The process 700 is described with reference to the environment 200 and may be performed by the computing device 202, the service provider 216, or a combination thereof. Of course, the process 700 may be performed in other similar and/or different environments.

At 702, the operation includes identifying bounding regions of possible label elements. For example, the operation 702 can include determining one or more coordinates associated with label elements that define a spatial location of the label element on a website. In some instances, this operation 702 can include determining a label element based at least in part on one or more attributes in the DOM tree and/or in HTML, XML, or XHTML data associated with a website. In some instances, this operation can be performed in response to determining that identifying information for one or more input elements has changed, is missing, or is insufficient to identify the input element with a confidence level above a threshold value.

At 704, the operation can include identifying a bounding region for a target input element. In some instances, this operation can include identifying a particular input element as a target input element, which may include selecting the input element from a plurality of input elements. Further, this operation 704 can include determining one or more coordinates of the target input element based on DOM tree data, HTML, XML, etc.

At 706, the operation can include determining an expansion for the bounding region of the target input element. For example, in some instances, the expansion may include a default or initial amount, such as an absolute amount (e.g., 50 pixels) or a relative amount (e.g., 5%) by which to increase the bounding region. In some instances, this operation may also specify a default shape and/or a direction of expansion. In some instances, the expansion may be sized to be over-inclusive (e.g., to capture a majority of possible label elements) or under-inclusive (e.g., to capture one or no elements), followed by iteratively adjusting the bounding region as described herein.

At 708, the operation can include expanding the bounding region of the target input element, based on a determined expansion factor or type. Examples of expanding the bounding region are described in connection with the figure of this disclosure.

At 710, the operation can determine a number of intersections (if any) of the expanded bounding region associated with the target input element and a bounding region of possible input elements. In some embodiments, the operation 710 can include an analysis of coordinates of the bounding regions, such as the separating axis theorem. However, in general, the operation 710 can determine a collision between the expanded bounding region and a bounding region of a label element.

At 712, the operation can determine if a number of intersections is above a threshold. If "yes", indicating there were too many intersections between the expanded bounding region and the possible label elements, the operation can proceed to operation 714.

At 714, the operation can include adjusting a size and/or shape of expansion for a bounding region of the target input element. In some instances, the size of the expansion may remain static (e.g., 50 pixels) but a shape of the bounding region may be adjusted, such as reducing a direction of expanding the bounding region (e.g., see FIG. 3D). In some instances, the size may be adjusted while keeping a same shape. In some instances, a size and shape may be adjusted, and the process 700 can continue with operations 708 and 710 to determine an updated expanded bounding region and intersections.

If the number of intersections is not above a threshold (e.g., "no" in operation 712), the operation can proceed to operation 716, which can include determining a confidence level that a target input element is associated with a label element. Further, the operation 716 can include determining a confidence level indicating an accuracy or likelihood of the accuracy that the target input element is associated with a particular type of input element.

Although the operation 712 is described as determining whether the number of intersections is above a threshold, the operation 712 can include determining whether the number of intersections is below a threshold, such as a case where an initial bounding box is set near a lower-bound size and subsequently increased to detect an intersection with possible label elements. In some instances, this implementation may provide determine a closest label element without capturing additional (and possibly incorrect) label elements. Thus, input elements can be identified using spatial information and described herein, facilitating identification of electronic forms.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A computer-implemented method comprising:
    receiving an indication that a user has navigated to a website;
    identifying elements of the website as identified elements;
    determining an individual element confidence by:
        determining that a first bounding region associated with an input element of the identified elements intersects a second bounding region associated with a label element of the identified elements; and
        determining that the input element is associated with the label element based at least in part on the determining that the first bounding region intersects the second bounding region;
    determining, based at least in part on the individual element confidence, that at least some of the identified elements of the website comprise an electronic form;
    generating an action associated with the electronic form; and
    verifying the action.

2. The computer-implemented method as recited in claim 1, wherein the identifying the elements of the website as the identified elements comprises at least one of:
    converting an image element into a text element; or
    converting an audio element into a text element.

3. The computer-implemented method as recited in claim 1, wherein the generating the action associated with the electronic form comprises generating a script to complete a task or to input data specified by the electronic form.

4. The computer-implemented method as recited in claim 3, wherein the verifying the action comprises:
    testing an operation of the script; and
    confirming that the task is completed or that the data specified by the electronic form is input.

5. The computer-implemented method as recited in claim 4, wherein the testing the operation of the script comprises at least one of:

running the script in multiple different types or versions of browsers;
running the script in multiple different types or versions of operating systems;
running the script on multiple different types of devices; or
running the script in multiple different languages.

6. The computer-implemented method as recited in claim 1, further comprising accessing one or more form rule sets, wherein the determining that the at least some of the identified elements of the website comprise the electronic form is based at least in part on the one or more form rule sets.

7. The computer-implemented method as recited in claim 1, wherein the identifying the elements of the website as the identified elements comprises populating a portion of the website to expose additional elements of the website.

8. The computer-implemented method as recited in claim 6, wherein the at least some of the identified elements comprise input elements, and wherein the one or more form rule sets include one or more rules or criteria indicating at least one of:
 a number of input elements;
 a type of input element;
 a proximity of the input elements; or
 a keyword associated with the input elements.

9. A system comprising:
 one or more processors; and
 memory storing computer-executable instructions that, when executed by the one or more processors, cause the system to:
  receive an indication that a user has navigated to a website;
  identify elements of the website as identified elements;
  determine an individual element confidence by:
   determining that a first bounding region associated with an input element of the identified elements intersects a second bounding region associated with a label element of the identified elements; and
   determining that the input element is associated with the label element based at least in part on the determining that the first bounding region intersects the second bounding region;
  determine, based at least in part on the individual element confidence, that at least some of the identified elements of the website comprise an electronic form;
  generate an action associated with the electronic form; and
  verify the action.

10. The system as recited in claim 7, wherein the identified elements include at least one of:
 a label element;
 content;
 a button; or
 a drop-down menu.

11. The system as recited in claim 9, wherein identifying the elements of the website as the identified elements is based at least in part on one or more attributes included in at least one of Hypertext Markup Language (HTML) associated with the website, Extensible Markup Language (XML) associated with the website, Extensible HTML (XHTML) associated with the website, or a Document Object Model (DOM) tree associated with the web site.

12. The system as recited in claim 9, wherein generating the action associated with the electronic form comprises accessing user data that is to be input to the electronic form.

13. The system as recited in claim 9, wherein generating the action associated with the electronic form comprises generating a script to complete a task or to input data specified by the electronic form.

14. The system as recited in claim 9, wherein the computer-executable instructions, when executed by the one or more processors, further cause the system to access one or more form rule sets, wherein determining that the at least some of the identified elements of the website comprise the electronic form is based at least in part on the one or more form rule sets.

15. The system as recited in claim 14, wherein the at least some of the identified elements comprise input elements, and wherein the one or more form rule sets include one or more rules or criteria indicating at least one of:
 a number of input elements;
 a type of input element;
 a proximity of the input elements; or
 a keyword associated with the input elements.

16. The system as recited in claim 14, wherein the one or more form rule sets include a confidence level threshold, and wherein determining that the at least some of the identified elements of the website comprise the electronic form is based at least in part on the confidence level threshold.

17. One or more non-transitory computer-readable media storing computer-executable instructions that, when executed by one or more processors, perform acts comprising:
 receiving an indication that a user has navigated to a website;
 identifying elements of the website as identified elements;
 determining an individual element confidence by:
  determining that a first bounding region associated with an input element of the identified elements intersects a second bounding region associated with a label element of the identified elements; and
  determining that the input element is associated with the label element based at least in part on the determining that the first bounding region intersects the second bounding region;
 determining, based at least in part on the individual element confidence, that at least some of the identified elements of the website comprise an electronic form;
 generating an action associated with the electronic form; and
 verifying the action.

18. The one or more non-transitory computer-readable media as recited in claim 17, wherein the acts further comprise accessing one or more form rule sets, wherein the determining that the at least some of the identified elements of the website comprise the electronic form is based at least in part on the one or more form rule sets.

19. The one or more non-transitory computer-readable media as recited in claim 18, wherein the at least some of the identified elements comprise input elements, and wherein the one or more form rule sets include one or more rules or criteria that indicate at least one of:
 a number of input elements;
 a type of input element;
 a proximity of the input elements; or
 a keyword associated with the input elements.

20. The one or more non-transitory computer-readable media as recited in claim 17, wherein:

the generating the action associated with the electronic form comprises generating a script to complete a task or to input data specified by the electronic form; and the verifying the action comprises:
   testing an operation of the script; and
   confirming that the task is completed or that the data specified by the electronic form is input.

\* \* \* \* \*